April 21, 1953 A. E. GENTRY ET AL 2,635,453
TORQUE TESTING DEVICE
Filed May 19, 1949
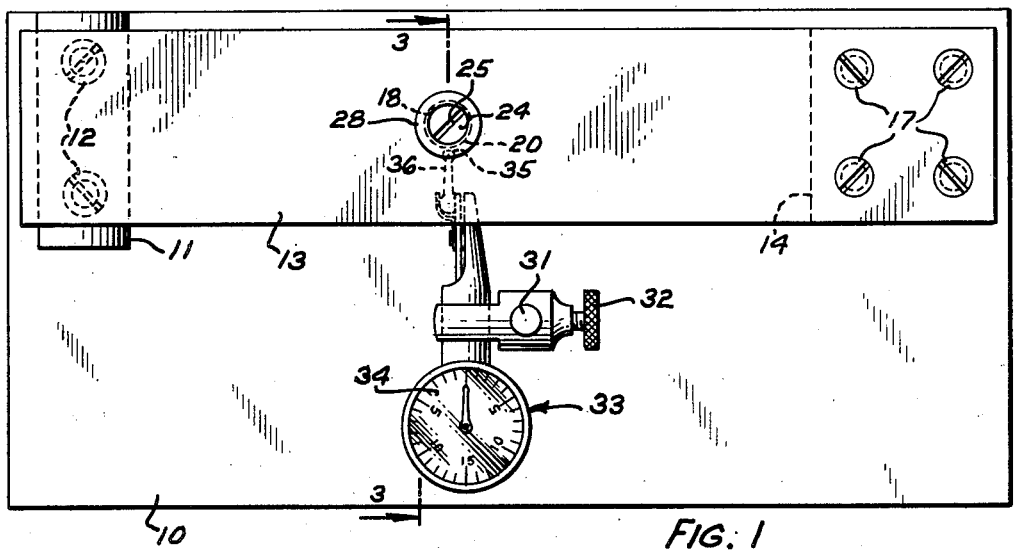
FIG. 1
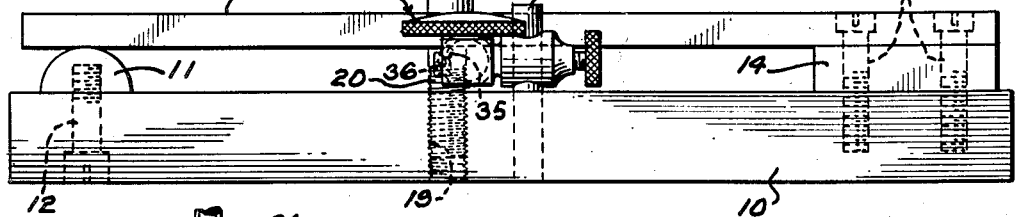
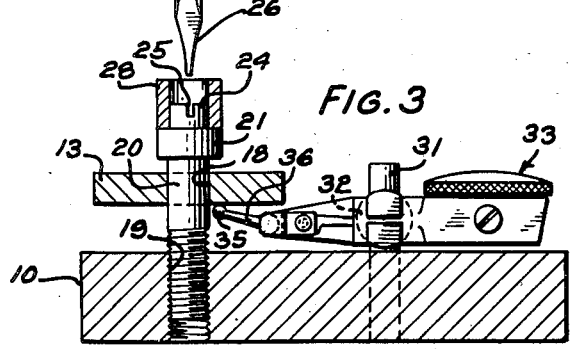
INVENTORS
A. E. GENTRY
R. R. THEILER
BY C. H. Kane
ATTORNEY Patented Apr. 21, 1953

2,635,453

UNITED STATES PATENT OFFICE 2,635,453

TORQUE TESTING DEVICE

Allen E. Gentry, Oak Park, and Roland R. Theiler, Chicago, Ill., assignors to Western Electric Company, Incorporated, New York, N. Y., a corporation of New York Application May 19, 1949, Serial No. 94,212

5 Claims. (Cl. 73—1)

This invention relates to testing devices and more particularly to a gage for determining the output torque of a rotary tool.

The primary object of this invention is to provide a simple and practicable device for efficiently determining output torque of such a tool.

In accordance with the above object, the present invention, in one embodiment thereof, as applied to a gage for determining the output torque of a rotary tool, such as a power driven screw driver, comprises a simple horizontally disposed beam fixed at one end to a base and having its opposite end bearing on an arcuate-surfaced support on the base, the bottom surface of the beam being normally substantially parallel to and spaced from the base. Freely extending through an aperture in the beam midway of its span length and breadth is a hardened steel-headed operating screw, the shank of which is threaded into an aligned threaded aperture in the base, whereby, when the screw is threaded into the aperture in the base by a screw driver to be tested, the deflection of the beam will be a measure of the output torque of the screw driver. The deflection of the beam is measured by a dial indicator type of micrometer gage having a dial face calibrated to read in inch pounds and thus it may be readily determined whether the screw driver is developing the desired torque inch pounds.

Other objects and advantages of this invention will more fully appear from the following detailed description taken in conjunction with the accompanying drawing, in which Fig. 1 is a plan view of a gage for determining output torque of a rotary tool embodying the features of the invention;

Fig. 2 is a front elevational view of the gage shown in Fig. 1 and showing fragmentarily an air driven screw driver about to be applied thereto for determining its output torque; and Fig. 3 is a vertical section taken on the line 3—3 of Fig. 1.

Referring now to the drawing in detail, 10 indicates a rectangular shaped base provided upon its upper surface adjacent its left end and adjacent its rear portion, as viewed in Fig. 1, with a semi-cylindrical beam support 11 having its flat bottom surface abutting the upper surface of the base and fixed to the latter by screws 12—12. Bearing against the support 11 with its left end bottom surface is a simple bar type beam 13 of hardened steel, having its upper and lower surfaces plane and substantially parallel to each other. The beam 13 is fixed at its opposite end to the base 10, with its bottom surface arranged in spaced substantially parallel relation to the upper surface of the base. A spacer plate 14, having a thickness of approximately .005″ less than the height of the beam support 11 above the upper surface of the base is interposed between the opposed support bottom surfaces of the base 11 and beam 13, respectively, the beam and plate being fixed to the base by screws 17—17. This difference in the spacing of the bottom surface of the beam 13 at opposite ends from the upper surface of the base 10 will insure that the left end of the beam will bear against the support 11. Formed in the beam 13 midway of its span, which extends between its points of rest upon the support 11 and the left vertical surface of the spacer plate 14 and midway of its breadth, is an aperture 18, which is in alignment with a screw-threaded aperture 19 formed in the base. Freely rotatable in the beam aperture 18 is a hardened steel operating screw 20, having its screw-threaded shank threaded into the screw-threaded aperture 19 in the base 10. Upon its upper end, the screw 20 is provided with a head 21 formed upon its upper end with a reduced cylindrical portion 24 having a horizontally extending slot 25 formed in its upper surface for the reception of a tang 26 of an air driven screw driver 27, shown fragmentarily (Fig. 2). Press-fitted onto the portion 24 of the screw head 21 is a ring-shaped guard 28, which serves to prevent lateral movement of the screw driver tang 26 out of the slot 25 in the operation of the gage.

Fixed to the base 10 forward of the beam 13 (Fig. 1) is a vertical post 31, to which is clamped, by a thumb screw 32, a conventional dial indicator type of micrometer gage 33, which is preferably graduated to read in inch pounds, as indicated at 34. If desired, the dial indicator 33 may be graduated to read in thousandths of an inch, and from a table, the latter dimension may be readily converted to inch pounds. A contact end 35 of a pivotal actuating lever 36 of the dial indicator 33, which extends therefrom, bears, at all times, on the bottom surface of the beam 13 adjacent the operating screw 20, and, with no deflection of the beam, the dial reading will be zero.

Before using the torque gaging device, a suitable grease should be applied to the screw threads of the operating screw 20 and also to the annular bottom surface of the head 21 of the screw to minimize friction between the cooperating surfaces during the gaging operation. It is also desirable, when the tang 26 of the screw driver 27 is applied to the slot 25 of the screw 20, and before being set in motion to run the screw down, that the bottom surface of the screw head 21 should be spaced from the upper surface of the beam a distance equivalent to running the screw back four threads on the threads of the base aperture 19. This provides a suitable space between the beam 13 and the bottom surface of the screw head 21, which has to be closed up before such latter surface engages the beam surface, by which time the screw driver 27 is in full operation.

Thereafter, in using the device, the operating screw 20 is run down into the threaded base aperture 19 by the screw driver, which effects a downward deflection of the beam 13 and, consequently, a movement of the dial indicator actuating lever 36, which has its contact end 35 bearing on the bottom surface of the beam. This deflection of the beam 13 in thousandths of an inch is converted into inch pounds at 34 on the face of the dial indicator.

If the indicated developed torque of the screw driver 33 is less or greater than that desired, the screw driver, which is provided with suitable means for varying its output torque is adjusted to effect less or greater output torque thereof and is again tested and such adjustment and testing is repeated until the desired output torque is effected. It is also possible to vary the amount of power, either air or current, depending on the type of power-driven screw driver being tested, until the desired output torque is arrived at.

It is to be undestood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A gage for determining output torque of a rotary tool comprising a base, a beam capable of being flexed, means for supporting opposite ends of said beam with its bottom face spaced from an upper face of said base and with one end of said beam fixed relative to said base and the other end of said beam movable relative to said base, a headed operating screw freely extending through an aperture formed in said beam and threaded into an aligned threaded aperture formed in said base, and indicating means responsive to a deflection of said beam whereby, upon said screw which is adapted to be rotated by the rotary tool being run down into said threaded aperture, the beam is deflected and such deflection is indicated by said indicating means.

2. A gage for determining output torque of a rotary tool comprising a base, a flat beam capable of being flexed, means on said base for supporting opposite ends of said beam with its bottom face spaced from and substantially parallel to an upper face of said base and with one end of said beam fixed relative to said base and the other end of said beam movable relative to said base, a headed operating screw freely extending through an aperture formed in said beam midway of its span and threaded into an aligned threaded aperture formed in said base, and indicating means mounted on the base responsive to a deflection of said beam whereby, upon said screw being run down into said threaded aperture, the beam is deflected and such deflection is indicated by said indicating means.

3. A gage for determining output torque of a rotary tool comprising a base, a beam, spaced stationary members for supporting opposite ends of said beam with its bottom face spaced from an upper face of said base, one end of said beam being attached to one of said stationary members and the other end of said beam bearing upon the other of said stationary members, a headed operating screw freely extending through an aperture formed in said beam midway of its spaced points of support and threaded into an aligned threaded aperture formed in said base, and indicating means having an actuator extending therefrom to bear against the bottom face of the beam whereby, upon said screw being run down into said threaded aperture by the rotary tool, the beam is deflected and such deflection is indicated by said indicating means.

4. A gage for determining output torque of a rotary tool comprising a base, a beam, a stationary member having an arcuate surface upon which one end of said beam bears, a second member spaced from said first member and to which the opposite end of said beam is fixed, said members cooperating to support said beam with its bottom face spaced from and substantially parallel to an upper face of said base, a headed operating screw having its lower annular surface normally spaced from the upper face of said beam and its shank freely extending through an aperture formed in the beam midway of its span length and breadth and threaded into an aligned threaded aperture formed in said base, and a dial indicator type of micrometer gage mounted on said base and having an actuator extending therefrom to bear against the bottom face of the beam whereby, upon said screw which is adapted to be rotated by the rotary tool being run down into said threaded aperture, the beam is deflected and such deflection is indicated by the dial indicator.

5. A gage for determining output torque of a rotary tool comprising a base having a threaded aperture therein, a beam having an aperture therein, means engageable with the opposite ends of said beam for supporting said beam in spaced relation to said base and for securing one end of said beam in fixed relation to said base, a headed operating screw extending through the aperture in said beam and threaded into the threaded aperture in said base adapted to be rotated by the rotary tool to deflect said beam, indicating means having an element movable with said beam for indicating the deflection thereof, and means for mounting said indicating means in fixed relation to said base.

ALLEN E. GENTRY.
ROLAND R. THEILER.

References Cited in the file of this patent

UNITED STATES PATENTS

| Number | Name | Date |
| --- | --- | --- |
| 2,319,299 | Converse | May 18, 1943 |
| 2,503,649 | Zimmerman | Apr. 11, 1950 |